Dec. 13, 1932.  J. W. OFFUTT  1,890,824
BLOOM PLANER
Filed Jan. 11, 1930   3 Sheets-Sheet 2

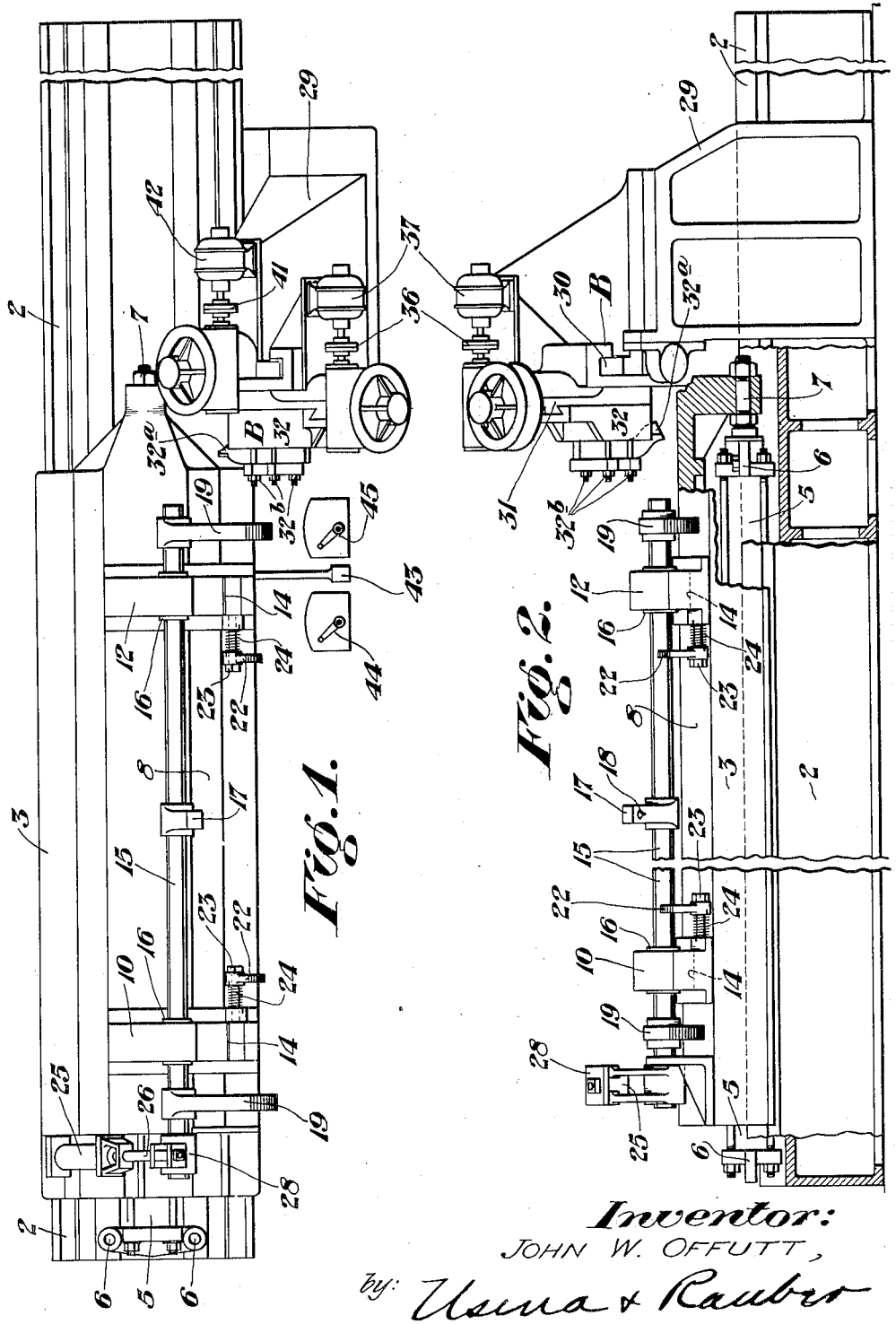

Inventor:
JOHN W. OFFUTT,
by Moina & Rauber
his Attorneys.

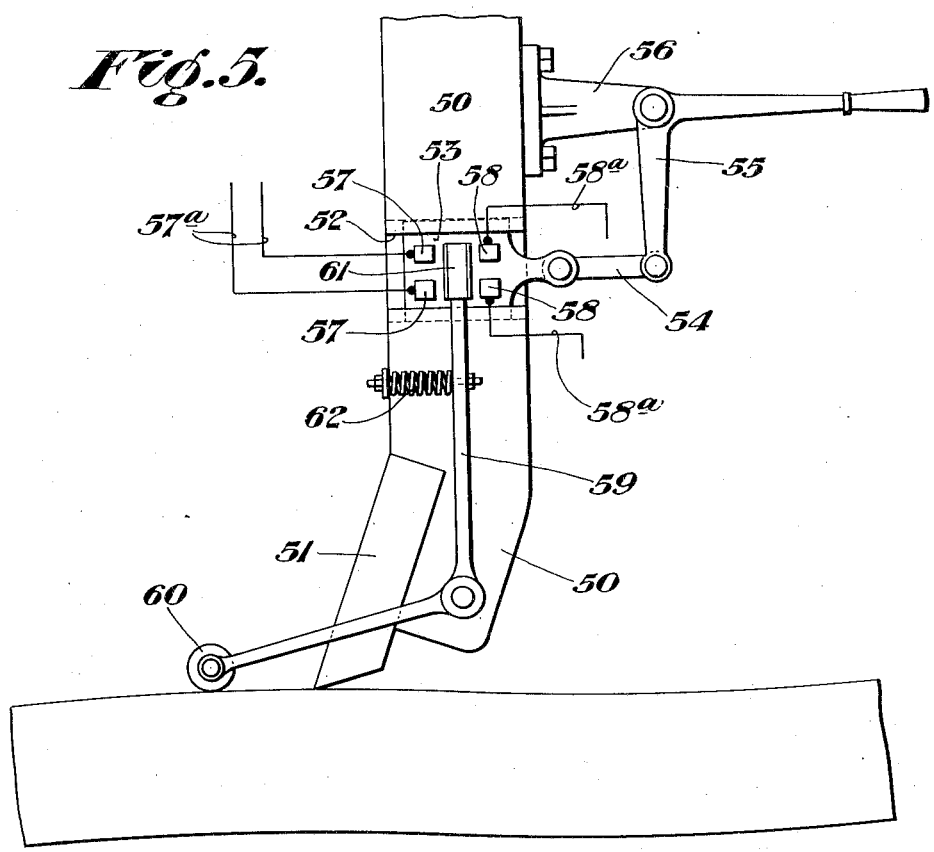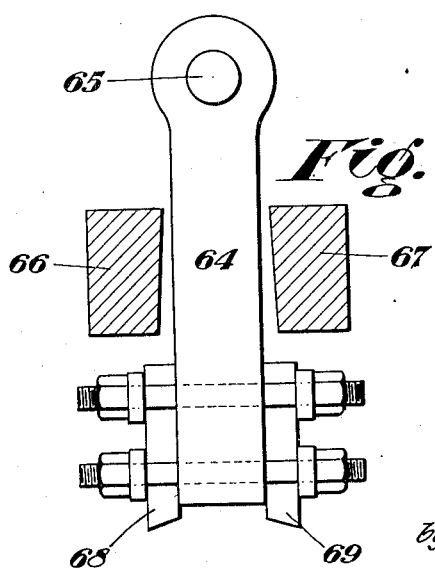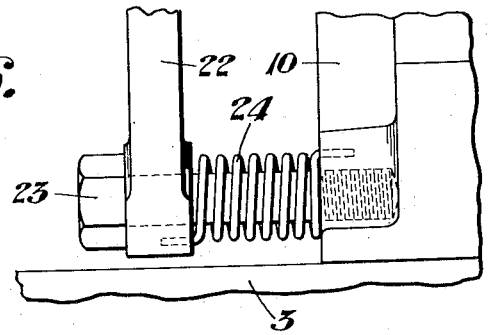

Patented Dec. 13, 1932

1,890,824

UNITED STATES PATENT OFFICE

JOHN W. OFFUTT, OF ELLWOOD CITY, PENNSYLVANIA

BLOOM PLANER

Application filed January 11, 1930. Serial No. 420,165.

This invention relates to metal working machines and more particularly to a power planer and has for its object the provision of a planer particularly adapted for cutting out or removing defects from rolled blooms, billets, slabs, bars and the like.

In the manufacture of steel and some non-ferrous articles, it is common practice to remove surface defects such as cracks, scabs, slivers, etc., during some stage of the manufacture. Heretofore, these defects have generally been removed by the use of portable hand tools such as grinders or power hammers. The defects are obliterated by removing enough metal contiguous to the defect so that when subsequent operations such as rolling or hammering are applied, the defects are not carried on with the material to appear in the finished articles. When the metal adjacent the defect is removed properly the depression caused by its removal is eliminated by the flow of metal into or around the depression so that a uniform surface is obtained on the finished article.

The operation of removing defects by hand tools as described above is a very laborious and slow process, entailing considerable cost.

The present invention provides a power machine particularly adapted for removing the defects from blooms, slabs, etc., and will be materially speedier than the old hand tools and will require materially less labor.

Experience has shown that a planer constructed in accordance with this invention is capable of doing the amount of work that 10 to 15 operators can do with hand tools in a given time.

In the drawings:

Figure 1 is a plan of a machine constructed in accordance with this invention.

Figure 2 is a side elevation thereof, partly broken away to show details of construction.

Figure 4 is a fragmentary detail showing the mounting of the holding dogs.

Figure 5 is an elevation showing a modified form of tool that may be used with this machine.

Figure 6 is an elevation of a still further modified form of tool.

Figure 3:
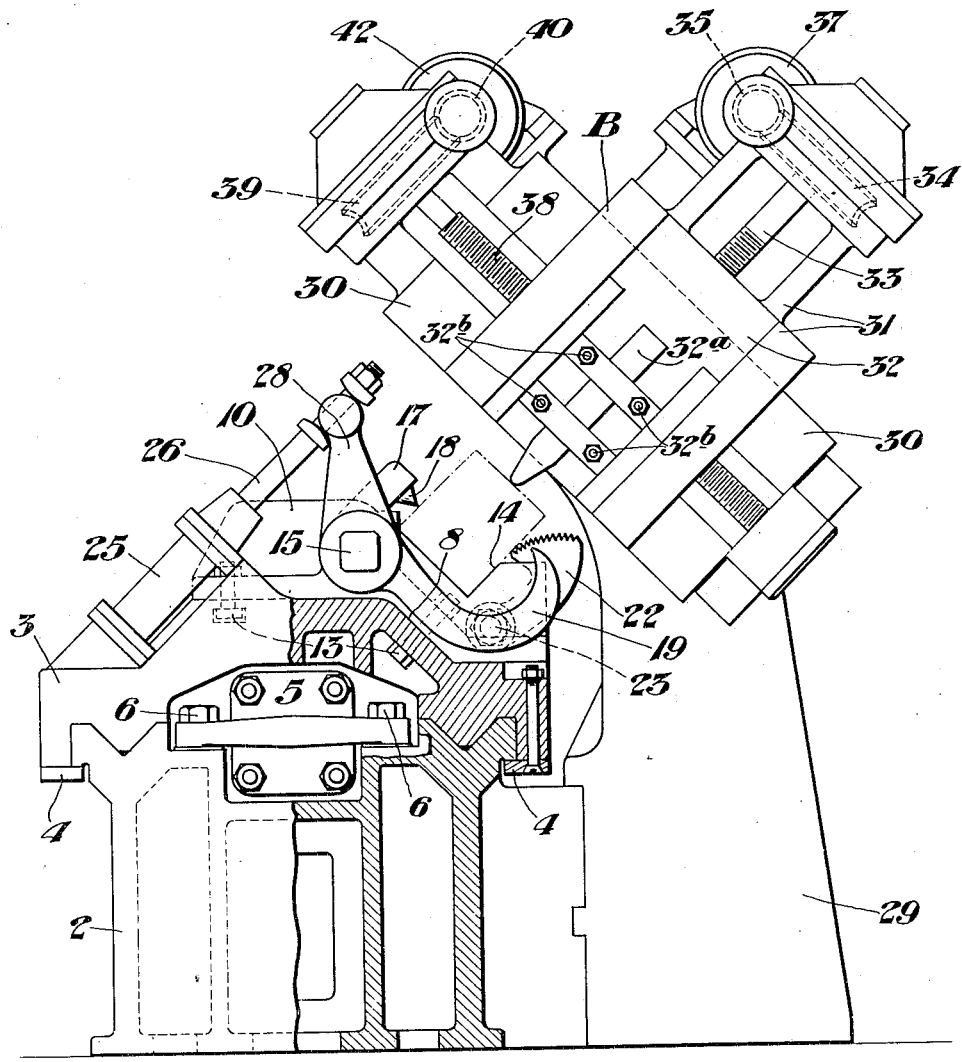
Figure 3 is an end elevation, partly in section.

Referring more particularly to the drawings the numeral 2 comprises the base on which a table 3 is slidably mounted for reciprocatory movement longitudinally thereof. The table is held from displacement by the usual gib plates 4.

The table is adapted to be reciprocated by an oil cylinder 5 which is bolted to the base 2, as at 6, and has its piston rod secured to the rear end of the table, as at 7. It will be understood that, if desired, any other power means may be substituted for the cylinder 5 to reciprocate the table 3.

The table 3 is provided with a work-holding face 8 inclined downwardly toward the operator's side of the machine in order to present the face of the work-piece to the operator and also to cause the cuttings to fall from the work by gravity.

A pair of work-supporting blocks 10 and 12 are slidably mounted on the work-holding face 8 of the machine and are detachably locked in position by bolts 13. The blocks 10 and 12 are each provided with a V-shaped recess 14 adapted to receive the work-piece and hold it in position with its face being cut toward the operator.

Another advantage gained by positioning the work-piece as above described, is that when cutting rectangular work-pieces, such as blooms, the corners are presented at the top where they may be readily cut to remove defects.

The blocks 10 and 12 have their upper portions apertured to form bearings for a rock-shaft 15 which is square in cross-section and is provided with bearing sleeves 16 which fit within the bearing apertures of the blocks 10 and 12.

A chucking lever or dog 17 is secured to the shaft 15 and carries a bit 18 adapted to bite into the work-piece when the the lever is forced into engagement with the work-piece by the rotation of the shaft toward the work-piece.

A pair of work-turning levers 19 are adjustably mounted on the rock-shaft 15 and are curved so as to project under the work-piece and over to the operator's side of the table. The levers 19 are adapted to move in the reverse direction to the lever or dog 17 when the shaft 15 is rocked, that is, in the reverse direction relative to the work-piece. Therefore, when the dog 17 is moved upwardly away from the work the levers 19 will move into engagement with the work-piece.

In order to aid in turning the bloom or other work-piece and prevent it slipping back during the turning operation a holding dog 22 is pivotally mounted on an elongated stud 23 secured to the side of each of the blocks 10 and 12. A coiled spring 24 is mounted on the stud and has one end anchored in the block while its other end is anchored under tension in the dog 22 so as to normally force said dogs inwardly toward the work-piece.

When it is desired to turn the work-piece the rock shaft 15 is turned counter-clockwise by the action of the cylinder 25, thus releasing the gripping dog 17 and bit 18, at the same time raising the curved arms 19, which engage the lower corner of the work-piece, raising the work-piece substantially vertically. The dogs 22, being spring pressed, are forced inwardly against the work-piece, and as the work-piece is raised by the levers 19 the dogs 22 will move inwardly so that when the levers 19 have reached their limit of movement the dogs 22 will be in contact with the lower corner of the work-piece. The cylinder 25 will then be reversed and the levers 19 lowered, and since the lower corner of the work-piece is supported by the dogs 22, the work-piece will be turned 90 degrees when returning by gravity against the blocks 10 and 12.

The shaft 15 is adapted to be rocked or rotated by an oil cylinder 25 which is mounted on the table 3 and has its piston rod or plunger 26 operatively connected to a crank-lever 28 secured to the forward end of the shaft 15. It will be understood that, if desired, any other form of power operating device may be substituted for the cylinder 25.

A tool-head supporting pedestal 29 is mounted along one side of the machine and has its head supporting portion or rail 30 extending over the table 3 on an incline so as to support the tool-head in a plane parallel with the face of the work-piece to be cut.

A tool-head B is mounted on the rail portion 30 of the head support and comprises a back-plate 31 slidably mounted on the rail 30 for movement longitudinally of the rail or transverse of the work-piece, and a tool carrying front-plate 32 is slidably mounted for up and down movement on the back-plate 31 toward and away from the work-piece. A tool 32$^a$ is clamped on the plate 32 by clamps 32$^b$.

The front-plate 32 has a threaded engagement with a screw-shaft 33 journaled in the back-plate 31 of the head. A worm-wheel 34 is secured on the screw-shaft 33 and is in mesh with a worm 35 which is connected by a coupling 36 to the armature shaft of an operating motor 37.

The back-plate 31 has a threaded engagement with a screw-shaft 38 journaled in the rail portion 30 of the head support. A worm-wheel 39 is secured on the screw-shaft 38 and meshed with a worm 40 which is connected by a coupling 41 to the armature shaft of an operating motor 42.

The cylinder 5 is adapted to be controlled by a suitable foot pedal 43 indicated at the operator's side of the machine, which pedal will operate a suitable valve or other standard control device (not shown).

The motors 37 and 42 are adapted to be controlled by suitable standard controllers 44 and 45 located on the operator's side of the machine adjacent the foot pedal 43. By thus grouping the pedal 43 and controllers 44 and 45 the operator can simultaneously operate all of the controls so as to follow the irregular surface of the work-piece.

In Figure 5 I have shown a modified form of tool for use with this machine. This tool comprises a shank portion 50 having a bit 51 welded or otherwise secured thereto. The tool is clamped on the front-plate 32 of the tool-head by the clamps 32$^b$.

The shank portion 50 is provided adjacent its upper end with a pair of guide ribs 52 between which a cross-head 53 is slidably mounted. The cross-head 53 is connected by a link 54 to one arm of a crank-lever 55 which is pivotally mounted on a bracket 56 secured to and projecting from the side face of the front-plate 32 of the tool-head.

Two pairs of contacts 57 and 58 are mounted on and insulated from the cross-head 53 and a crank-lever 59 is pivotally mounted on the shank 50 of the tool and has one arm extending up between the pairs of contacts 57 and 58, while its other arm extends forwardly a material distance in advance of the tool and is provided with a wheel 60. The upper end of the arm of lever 59, extending between the pairs of contacts 57 and 58, is provided with a bridging contact 61. The contacts 57 and 58 are provided with leads 57$^a$ and 58$^a$, respectively, which form part of the forward and reverse circuits to the motor 37. The wheel 60 is normally held in contact with the work by a spring 62.

In operation, this modified form of tool will automatically control the depth of cut.

The tool will first be spotted or moved into cutting position by the operator manually moving the cross-head 53 by rocking lever 55 so as to bring the contacts 57 or 58 into engagement with the contacts 61 on the lever 59. After the tool is positioned for the cut, the cross-head will be returned to its normal position and the tool will remain stationary until the lead wheel 60 is caused to raise or lower by irregularities in the work-piece sufficiently to rock the lever 59 so as to bridge the contacts 57 or 58. It will thus be seen that the depth of the cut will be automatically controlled.

It will be understood that when this modified form of tool is used the controller 44 may be dispensed with since the mechanism of the tool will be sufficient to control its position relative to the work. However, if desired, the controller 45 may be used in combination with the automatic control.

In Figure 6 I have shown a still further modified form of tool comprising a shank 64 which is pivotally mounted on the front-plate 32 of the tool-head by a pin 65. The shank 64 has a limited swinging movement between stops 66 and 67 and carries front and back tools 68 and 69, respectively. In operation, when this last described tool is used a cut is made on both the forward and reverse movements of the work-piece. When the work-piece is moving forwardly the back tool 69 will be engaged by the work and the shank 64 will be rocked forwardly into engagement with the stop 66. When the work-piece is reversed and moved rearwardly the tool 69 will cause the shank 64 to pivot about the pin 65 and into engagement with the stop 67 so as to move the tool 68 down into cutting position. The tools 68 and 69 will thus be alternately moved into cutting position with the reverse movements of the work-piece.

While I have shown certain specific embodiments of my invention it will be understood that I do not wish to be limited thereto since various modifications may be made without departing from the scope thereof, as defined in the appended claims.

I claim:

1. In a planer, a table mounted for reciprocatory movement, said table having its work-holding face inclined transversely toward the operator's side of the planer, power-operated means for clamping the work on the table and other power-operated means for turning the work-piece ninety degrees on said table, and means for interlocking said clamping means and said turning means so that said clamping means will operate to release said work before said turning means is operated to turn the work-piece.

2. In a planer, a table mounted for reciprocatory movement, said table having its work-holding face inclined transverely toward the operator's side of the planer, a pair of work-supporting blocks adjustably and removably mounted on the work-holding face of said table, said blocks being provided with V-shaped recesses to receive the work-piece and hold it in position with its face to be cut toward the operator, a rock shaft journaled in bearings in the upper portions of said blocks, a chucking lever carried by said shaft and adapted in one position of the shaft to engage and lock the work-piece in the recesses in said work-supporting blocks, and means operable by said shaft for turning the work-piece ninety degrees when said shaft is rocked into position to release said chucking lever.

3. In a planer having a table with its work-holding face inclined transversely toward the operator's side of the planer, a pair of work-supporting blocks mounted on the work-holding face of said table, said blocks being provided with V-shaped recesses to receive the work-piece and hold it in position with its face to be cut toward the operator, a rock shaft journaled in bearings in the upper portions of said blocks, at least one chucking lever mounted against turning on said shaft and adapted to engage the rearwardly inclined face of the work-piece in one position of said shaft to lock the work-piece in the recesses in said blocks, and at least one pair of work-turning levers mounted against turning on said rock shaft and curved so as to project under said work-piece, said turning levers being clear of the work-piece when the chucking lever is in engagement with the work-piece, and being adapted to engage the lower corner of the work-piece when said rock shaft is rocked to release said chucking lever so as to lift and turn said work-piece about its longitudinal axis.

4. In a planer having a table with its work-holding face inclined transversely toward the operator's side of the planer, a pair of work-supporting blocks mounted on the work-holding face of said table, said blocks being provided with V-shaped recesses to receive the work-piece and hold it in position with its face to be cut toward the operator, a rock shaft journaled in bearings in the upper portions of said blocks, at least one chucking lever mounted against turning on said shaft and adapted to engage the rearwardly inclined face of the work-piece in one position of said shaft to lock the work-piece in the recesses in said blocks, at least one pair of work turning levers mounted against turning on said rock shaft and projecting under said work-piece, said turning levers being clear of the work-piece when the chucking lever is in engagement with the work-piece, and being adapted to engage the lower corner of the work-piece when said rock shaft is rocked to release said chucking lever so as to lift and turn said work-piece, and spring pressed holding dogs normally tensioned inwardly against the under inclined face of the work-piece and adapted to move inwardly under the lower corner of the work-piece as it is lifted and turned by said turning levers to support the corner of said work-piece when said turning levers are moved away from the work-piece thereby insuring the turning of said work-piece.

5. In a planer, a table mounted for reciprocatory movement, power operated means mounted on said table for lifting the work vertically, means mounted on said table for confining the force of gravity to cause the work to turn through an angle of approximately 90°.

6. In a planer, a table mounted for reciprocatory movement, power operated means for lifting the work vertically on said table, means associated therewith and with said table for confining the force of gravity to cause the work to turn through an angle of approximately 90°, power means for clamping the work on the table, and means for interlocking the clamping means and the lifting means so that the former is rendered inoperative when the latter is operated.

7. In a planer, a table mounted for reciprocatory movement, power operated means mounted on said table for lifting the work vertically, and separate means mounted on said table for preventing one longitudinal side of the work from falling by gravity when released by said means, thereby causing the force of gravity to impart a revolving movement to said work.

8. In a machine as described, a movable work supporting table, means for securing the work to the table for movement therewith, means mounted on the table for raising the work from the table, and means mounted on the table for engaging the work after it is raised to cause it to revolve as it descends onto the table after being released by said lifting means.

9. In a machine as described, a movable work supporting table, means for securing the work to the table for movement therewith, means supported on the table for raising the work from the table, and dog means pivotally mounted on the table for engaging the work when it is released by said lifting means to revolve it.

10. In a machine as described, the combination comprising a tool holder, a movable work supporting table, means for securing the work to the table so as to present a surface to the tool holder, means pivotally mounted on the table for raising the work from the table, and stop means mounted on the table automatically movable into engagement with the work when in raised position to cause the work to revolve when released by the lifting means, so that it presents a new surface to the tool holder when it returns to the table.

11. In a machine as described, the combination comprising a tool holder, a movable work supporting table, means forming part of the table for securing the work to the table so as to present a surface to the tool holder, means movably mounted on the table for raising the work from the table, stop means on said table automatically movable into engagement with the work when in raised position to cause the work to revolve when released by the lifting means, so that it presents a new surface to the tool holder when it returns to the table, and means operatively connecting the securing means and the raising means so that the work is released before it is lifted.

12. In a machine as described, the combination comprising a tool holder, a movable work table supported at an angle with the horizontal, means for securing the work to the table so as to present a surface thereof to the tool holder, power operated means forming a part of the machine for raising the work from the table, and means for automatically engaging an edge of the work as the raising means releases it to cause it to rotate and return to the table.

In testimony whereof, I have hereunto set my hand.

JOHN W. OFFUTT.